Sept. 12, 1967  J. CHASS  3,340,738
MAGNETOSTRICTIVE TRANSDUCER
Original Filed March 25, 1963
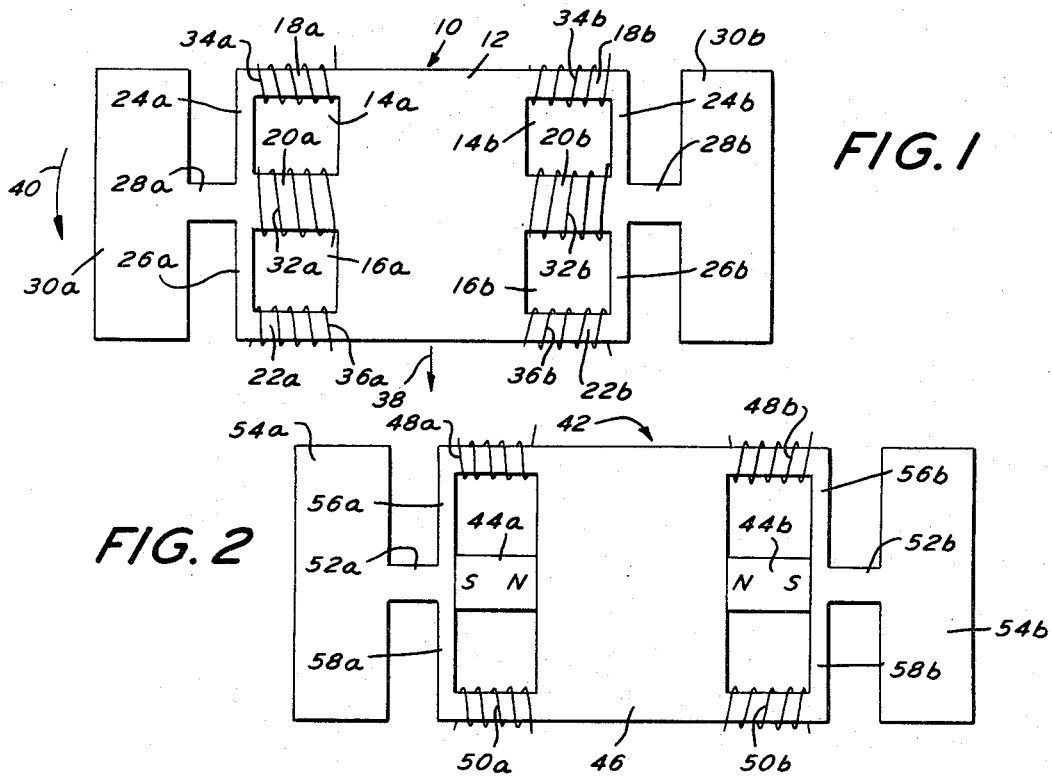
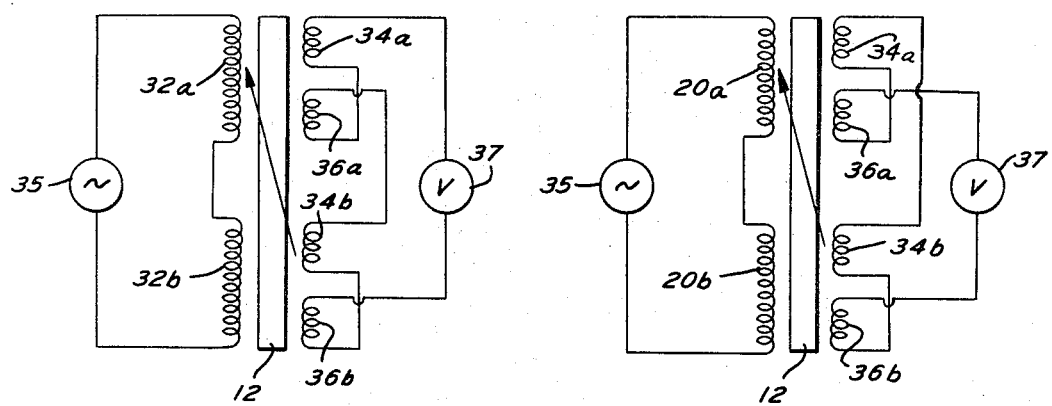
INVENTOR
JACOB CHASS
BY
ATTORNEY

# United States Patent Office 3,340,738
Patented Sept. 12, 1967

3,340,738
MAGNETOSTRICTIVE TRANSDUCER
Jacob Chass, Philadelphia, Pa., assignor, by mesne assignments, to Robinson-Halpern Company, West Conshohocken, Pa., a corporation of Pennsylvania
Original application Mar. 25, 1963, Ser. No. 267,423, now Patent No. 3,168,830, dated Feb. 9, 1965. Divided and this application July 17, 1964, Ser. No. 383,295
7 Claims. (Cl. 73—517)

The present invention relates to a transducer, and more particularly to a transducer for converting a physical force to an electrical signal for the purpose of measuring the physical force. This is a division of my pending application for United States Letters Patent Ser. No. 267,423, filed Mar. 25, 1963, entitled, "Transducer," now patent No. 3,168, 830.

For ease of measuring various types of forces, it is often desirable to convert the force to an electrical signal. The forces being measured can be those created by the pressure of a weight, the pressure or difference in pressures of a fluid or gas, or the forces created by acceleration. It is desirable that the device for converting the force to an electrical signal be small and compact, but be capable of measuring a relatively large range of forces. Also, the device should have no moving parts which can become worn or broken so that the device will have a long usable life. In addition, the device should be relatively simple in construction so as to be inexpensive to manufacture.

It is an object of the present invention to provide a novel transducer for converting a physical force to an electrical signal.

It is another object of the present invention to provide a novel accelerometer.

It is a further object of the present invention to provide a novel jerkmeter.

It is still another object of the present invention to provide a transducer which is small and compact, which has no moving parts, and which is relatively simple in construction.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a side elevational view of the transducer of the present invention in the form of an accelerometer.

FIGURE 2 is a side elevational view of the transducer of the present invention in the form of a jerkmeter.

FIGURE 3 is a diagram of an electrical circuit for using the accelerometer of the present invention for measuring linear acceleration.

FIGURE 4 is a diagram of an electrical circuit for using the accelerometer of the present invention for measuring rotational acceleration.

Referring initially to FIGURE 1, an accelerometer using the transducer of the present invention is generally designated as 10.

Accelerometer 10 comprises a rectangular plate 12 of a magnetic material the permeability of which varies when the material is stressed. Plate 12 is provided along one side edge thereof, with a pair of rectangular openings 14a and 16a, and along the other side edge thereof with a second pair of rectangular openings 14b and 16b. The openings 14a and 16a in the plate 12 form three parallel arms 18a, 20a and 22a connected together along the adjacent side edge of the plate 12 by two aligned legs 24a and 26a. The openings 14b and 16b in the plate 12 form three parallel arms 18b, 20b and 22b connected together along the adjacent side edge of the plate by a pair of aligned legs 24b and 26b. A pair of moment arms 28a and 28b project from the side edges of the plate 12 in alignment with the center arms 20a and 20b respectively. Separate weights 30a and 30b of the same size are secured to the ends of the moment arms 28a and 28b respectively. Separate primary windings 32a and 32b are helically wound around the center arms 20a and 20b respectively. Separate secondary windings 34a and 36a are helically wound around the arms 18a and 22a respectively, and separate secondary windings 34b and 36b are helically wound around the arms 18b and 22b respectively.

In the use of the accelerometer 10, the primary windings 32a and 32b are connected to a source 35 of alternating current as shown in FIGURE 3. The current in each of the primary windings produces a pair of magnetic flux paths so as to induce voltages of like magnitude across each of the secondary windings 34a, 36a, 34b, and 36b. However, since the magnetic flux paths of each pair of paths flow in opposite direction, the phase of the voltages induced across the secondary windings 34a and 34b are opposite to the phase of the voltages induced across the secondary windings 36a and 36b respectively.

When the accelerometer 10 is accelerated linearly, for example in the direction of the arrow 38, the weights 30a and 30b will apply a force on the moment arms 28a and 28b. The force applied to the moment arms will stress the legs 24a and 24b in compression, and will stress the legs 26a and 26b in tension. Since the plate 12 is of a material the permeability of which varies when the material is stressed, the stressing of the legs 24a, 26a, 24b and 26b by the force applied to the moment arms 28a and 28b will vary the permeability of the legs, and thereby vary the voltages induced across the secondary windings 34a, 36a, 34b and 36b. It is well known that stressing such materials in tension varies the permeability of the material differently than when the material is stressed in compression. For example, when the material is stressed in tension, the permeability of the material may decrease, whereas when the material is stressed in compression, the permeability of the material may increase. Since the legs 26a and 26b are stressed in tension by the force applied to the moment arms, the permeability of the legs 26a and 26b will decrease so as to decrease the voltage induced across the secondary windings 34a and 34b. However, since the legs 24a and 24b are stressed in compression, the permeability of the legs 24a and 24b will increase so as to increase the voltage induced across the secondary windings 32a and 32b. By measuring the difference between the voltages induced across the secondary windings, there is provided an indication of the acceleration of the accelerometer 10. Since the voltages induced across the secondary windings 34a and 34b are of opposite polarity to the voltages induced across the secondary windings 36a and 36b, by connecting the secondary windings as shown in FIGURE 3, voltmeter 37 will read the difference between the voltages induced across the secondary windings.

If the accelerometer 10 is rotated, for example in the direction of the arrow 40, any acceleration of the accelerometer 10 will cause the weights 30a and 30b to apply a force on the moment arms 28a and 28b respectively. This force applied to the moment arms 28a and 28b will stress the legs 24a and 26b in compression, and stress the legs 26a and 24b in tension. This in turn will vary the voltages induced across the secondary windings with the magnitude of the voltages induced across the secondary windings 34a and 36b being different from the magnitude of the voltages induced across the secondary windings 36a and 34b. The difference between the voltages induced across the secondary windings provides an indication of the amount of acceleration. By properly connecting the secondary windings, any linear acceleration response can be cancelled so that only rotary acceleration will be indicated. As shown in FIGURE 4, this can be achieved by connecting secondary windings 36a and 34b in series aiding relation, and secondary windings 34a and 36b in series aiding relation. Secondary windings 36a and 34b are then connected in bucking relation with secondary windings 34a and 36b. By series aiding relation it is meant that the secondary windings are connected in accordance with their polarity so that the voltages induced across the windings add together. By bucking relation it is meant that the secondary windings are connected in accordance with their polarity so that the voltages induced across the windings subtract from each other.

Thus, the accelerometer 10 of the present invention can be used to measure either linear or rotational acceleration. Although the accelerometer 10 is shown as having two sets of windings, one at each side edge thereof, for measuring linear acceleration, only one set of the windings is necessary.

Referring to FIGURE 2, a jerkmeter utilizing the transducer of the present invention is generally designated as 42. A jerkmeter is a device for measuring the rate of change of acceleration.

Jerkmeter 42 is similar in construction to the accelerometer 10 of FIGURE 1 except that instead of using a source of alternating current to create the magnetic flux paths, there is provided a source of a magnetic flux, the time derivative of which equals zero. By this it is meant that the source provides a magnetic flux the magnitude of which does not vary with time. As shown, one such source of the magnetic flux are a pair of permanent magnets 44a and 44b. The magnet 44a is mounted on the plate 46 parallel to and intermediate the secondary windings 48a and 50a. The magnet 44b is mounted on the plate 46, parallel to and intermediate the secondary windings 48b and 50b. Moment arms 52a and 52b extend from the side edges of the plate 46 in alignment with the magnets 44a and 44b, and weights 54a and 54b are mounted on the ends of the moment arms 52a and 52b respectively.

In the operation of the jerkmeter 42, each of the magnets 44a and 44b creates a pair of magnetic flux paths which extend through the secondary windings 48a, 50a and 48b and 50b. Thus, voltages of equal magnitude are induced across the secondary windings with the polarity of the voltages induced across the secondary windings 48a and 48b being opposite to the polarity of the voltages induced across the secondary windings 50a and 50b. When the jerkmeter 42 is moved linearly or is rotated, acceleration of the jerkmeter will cause the weights 54a and 54b to apply a force on the moment arms 52a and 52b respectively. The force applied to the moment arms 52a and 52b will stress the legs 56a, 58a and 56b, 58b of the plate 46 to vary the permeability of the legs. As was previously described with regard to the operation of the accelerometer 10 of FIGURE 1, the legs of the plate 46 will be stressed either in tension or compression depending on the type of movement of the jerkmeter 42. Stressing the legs of the plate 46 will vary the voltages induced across the secondary windings.

The voltage induced across each of the secondary windings is a function of $dI/dt$ where I is the permeability of the leg adjacent each of the secondary windings. Since the permeability is only varied by means of a force applied to the leg so as to stress the leg, the voltage induced across each of the secondary windings is a function of $dF/dt$, where F is a force applied to the moment arms upon accelerating the jerkmeter. Since the force equals mass times acceleration, and since the mass, the weights 54a and 54b, is constant, the voltage induced across each of the secondary windings is a function of $da/dt$ where $a$ is acceleration. Thus, the voltage output from the jerkmeter 42 of the present invention is a function of the rate of change of acceleration of the jerkmeter. The voltage output from the jerkmeter 42 is the difference between the voltage induced across the secondary windings. Thus, the jerkmeter 42 of the present invention will measure the rate of change of acceleration in the same manner that the accelerometer 10 of FIGURE 1 will measure acceleration.

Thus, there is provided by the present invention a transducer which can measure acceleration, or the rate of change of acceleration. A large range of forces can be accurately measured by the transducer of the present invention by varying the length of the moment arm or moment arms of the transducer. Since the transducer of the present invention has no moving parts, it has a long usable life. In addition, the transducer of the present invention is relatively small and compact, and simple in construction so as to be inexpensive to manufacture.

The present invention may be embodied in other specific forms without departing from the spirit or essential attributes thereof and, accordingly, reference should be made to the appended claims, rather than to the foregoing specification as indicating the scope of the invention.

I claim:

1. A transducer for measuring acceleration comprising a substantially rectangular plate of a magnet material the permeability of which varies when the material is stressed, said plate having a pair of spaced openings therethrough adjacent one side edge of the plate, said openings forming three spaced parallel arms which are perpendicular to the one side edge of the plate and a pair of aligned legs extending along said one side edge of the plate and connecting the center arm to the outer arms, a moment arm projecting from said one side edge of the plate in alignment with the center arm, a weight secured to the end of the moment arm, a separate secondary winding wound around each of the outer arms, and means for creating a pair of magnetic flux paths each of which extends through a separate one of said secondary windings to induce a voltage thereacross.

2. A transducer in accordance with claim 1 in which the means for creating the magnetic flux paths comprises a primary winding wound on the plate.

3. A transducer in accordance with claim 2 in which the primary winding is wound around the center arm.

4. A transducer in accordance with claim 1 in which the means for creating the magnetic flux paths creates flux paths the magnitude of which does not vary with time.

5. A transducer in accordance with claim 4 in which the means for creating the magnetic flux paths comprises a permanent magnet mounted parallel to and intermediate the outer arms.

6. An accelerometer comprising a substantially rectangular plate of a magnetic material the permeability of which varies when the material is stressed, said plate having two pairs of spaced openings therethrough, said pairs of openings being adjacent opposite side edges of said plate, each of said pairs of openings forming three spaced parallel arms which are perpendicular to the adjacent side edge of the plate and a pair of aligned legs extending along the adjacent side edge of the plate and connecting the center arm to the outer arms, a separate moment arm projecting from each of said side edges of the plate in alignment with the center arms, a separate weight secured to the end of each of the moment arms, a separate secondary winding wound around each of the outer arms, and a separate primary winding wound around each of the center arms.

7. A jerkmeter comprising a substantially rectangular plate of a magnet material the permeability of which varies when the material is stressed, said plate having a pair of openings therethrough, said openings being adjacent opposite side edges of said plate, each of said openings forming two spaced parallel arms which are perpendicular to the adjacent side edge of the plate and a pair of aligned legs extending along said adjacent side edge of the plate and connecting said arms, a separate permanent magnet secured across each of said openings parallel to said arms and at the junction of said legs, a separate moment arm projecting from each side edge of said plate in alignment with said magnets, a separate weight secured to the end of each of said moment arms, and a separate secondary winding wound around each of said arms.

No references cited.

JAMES J. GILL, *Acting Primary Examiner.*